(12) United States Patent
Hauser

(10) Patent No.: US 9,743,774 B1
(45) Date of Patent: Aug. 29, 2017

(54) PORTABLE SEAT SUCH AS FOR USE IN HUNTING AND PHOTOGRAPHY

(71) Applicant: Aaron L. Hauser, Greene, IA (US)

(72) Inventor: Aaron L. Hauser, Greene, IA (US)

(*) Notice: Subject to any disclaimer, the term of this patent is extended or adjusted under 35 U.S.C. 154(b) by 0 days.

(21) Appl. No.: 14/020,055

(22) Filed: Sep. 6, 2013

Related U.S. Application Data

(60) Provisional application No. 61/697,496, filed on Sep. 6, 2012, provisional application No. 61/812,897, filed on Apr. 17, 2013.

(51) Int. Cl.
*A47C 9/10* (2006.01)
*A47C 3/18* (2006.01)
*A01M 31/02* (2006.01)

(52) U.S. Cl.
CPC ............... *A47C 9/10* (2013.01); *A01M 31/02* (2013.01)

(58) Field of Classification Search
CPC ................................. A01M 31/02; A47C 3/18
USPC ...................................................... 297/217.1
See application file for complete search history.

(56) References Cited

U.S. PATENT DOCUMENTS

| 5,009,283 | A | | 4/1991 | Prejean | |
|---|---|---|---|---|---|
| 5,131,496 | A | | 7/1992 | White | |
| 5,439,074 | A | | 8/1995 | Trout et al. | |
| 5,476,241 | A | * | 12/1995 | Helman | 248/286.1 |
| 5,482,137 | A | | 1/1996 | McNeill | |
| 7,152,358 | B1 | * | 12/2006 | LeAnna et al. | 42/94 |
| 2009/0321186 | A1 | | 12/2009 | Louchart | |
| 2013/0186310 | A1 | * | 7/2013 | Lymberis | 108/137 |
| 2013/0257121 | A1 | * | 10/2013 | Otta | 297/217.1 |
| 2014/0131137 | A1 | * | 5/2014 | Bassett | 182/116 |
| 2014/0311828 | A1 | * | 10/2014 | Bassett et al. | 182/124 |

* cited by examiner

*Primary Examiner* — Timothy J Brindley
(74) *Attorney, Agent, or Firm* — McKee, Voorhees & Sease, PLC

(57) ABSTRACT

An apparatus, method, and system of supporting a person such as a hunter or photographer in a seated position includes a cantilever arm extending from a supporting structure and a seat that is eccentrically mounted to the cantilevered arm. The cantilevered arm and eccentric seat can be attached to a supporting structure to allow the cantilever arm to pivot at its end opposite its seat over a range. Optionally the seat and cantilevered arm can be cinched along a tree or other vertical structures, placed on ground supported structure, or on other elevating structures.

14 Claims, 14 Drawing Sheets

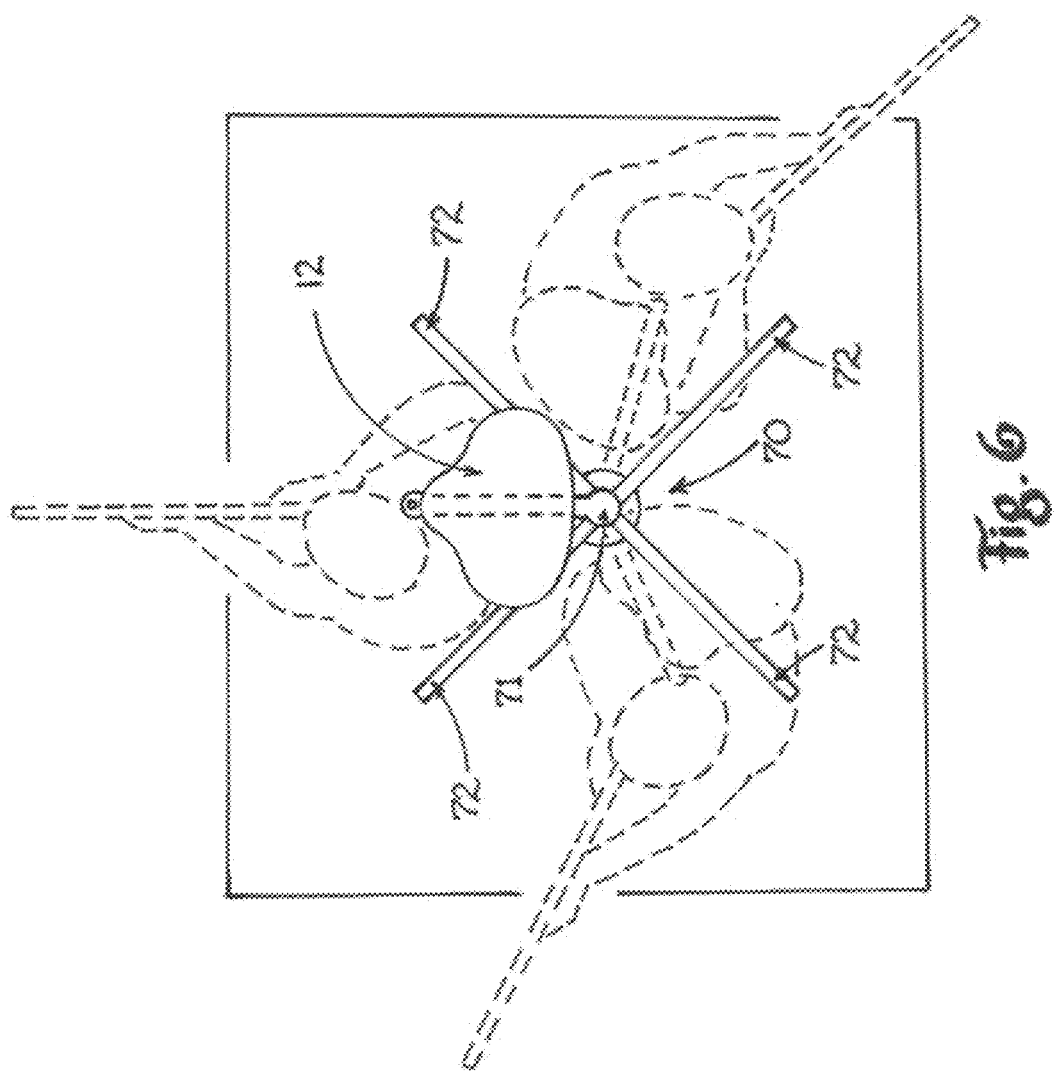

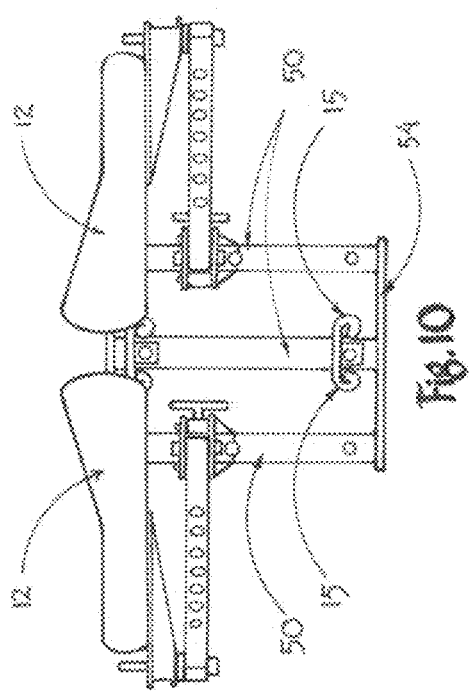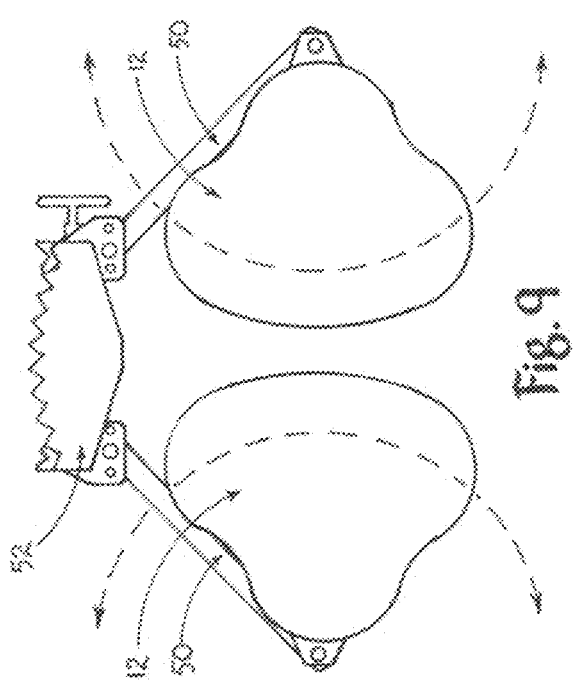

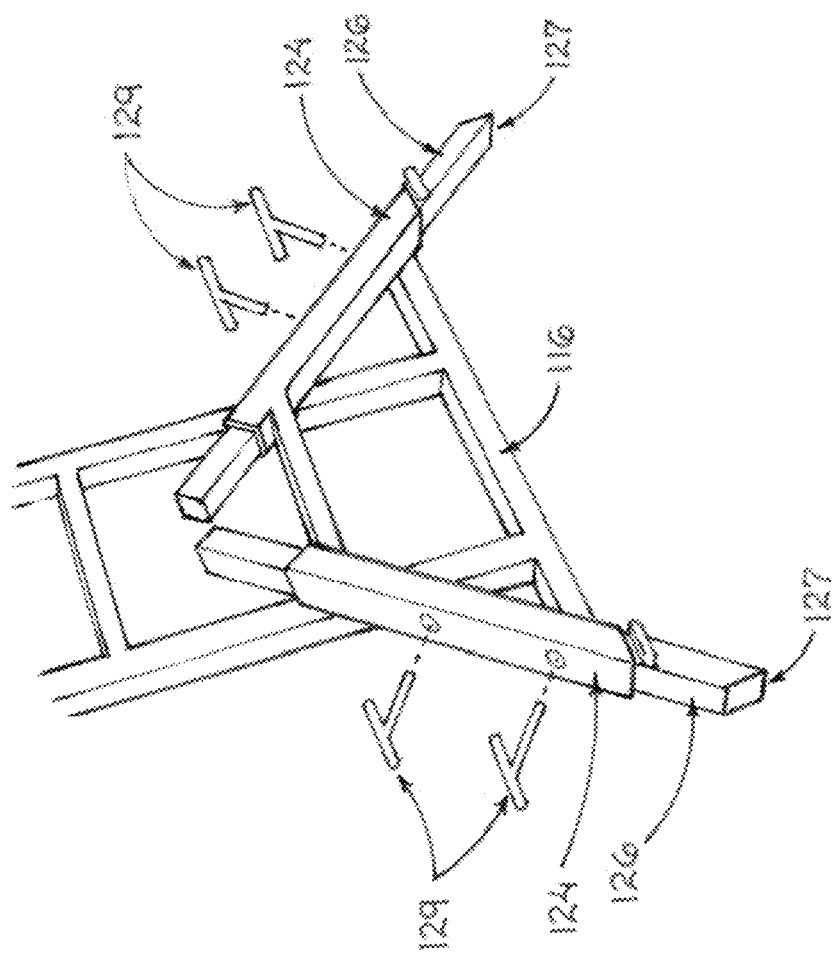

PORTABLE SEAT SUCH AS FOR USE IN HUNTING AND PHOTOGRAPHY

CROSS-REFERENCE TO RELATED APPLICATIONS

This application claims priority under 35 U.S.C. §119 to provisional application Ser. No. 61/697,496 filed Sep. 6, 2012 and Ser. No. 61/812,897 filed Apr. 17, 2013, each herein incorporated by reference in its entirety.

BACKGROUND OF THE INVENTION

Field of the Invention

The present invention relates to a portable seat and, in particular, a seat that can be utilized with a variety of bases or supports such as a tree stand mount, single or double ladder mount, tripod or on-ground mount, or others.

Problems in the Art

It is desirable to have a sturdy seat that is useful for out-of-doors and reasonably portable for a variety of applications. One example is hunting. Hunters and photographers need to sit still for sometimes long periods of time. They also need a stable support for firing a weapon or triggering a camera from a seated position. Such seats must be able to support a wide range of body types and weights. They must be robust enough for outside use over a range of environmental conditions. Additionally, it is usually desirable they be economical to make and use.

A number of different styles of hunting tree stands of this general type are known. Examples include U.S. Pat. No. 5,009,283, U.S. Pat. No. 5,131,496, U.S. Pat. No. 5,439,074, and U.S. Pat. No. 5,482,137, each of which is incorporated by reference herein in its entirety. There are even more varieties in the marketplace commercially available from many sources.

The inventor has discovered the benefit of being able to have some degree of freedom of movement while being seated. It can create problems to have a fixed-in-place seat when a hunter or photographer needs to shift aiming position.

Others have tried to provide some degree of freedom of movement. U.S. Pat. No. 5,009,283 has a seat that is adjustable in vertical height. U.S. Pat. No. 5,131,496 has an L-shaped arm that can pivot around a vertical axis near the point of support (e.g., at the perimeter of the tree). U.S. Pat. No. 5,439,074 has a chair back seat that pivots around a substantially vertical axis. U.S. Pat. No. 5,482,137 does likewise.

Other attempts are more complex. U.S. Published Application No. 2009/0321186 has two arms and a seat which pivot around vertical axes. This allows seat 82 to pivot around its basic center point but allows arms 78 and 80 to either be folded back up against the tree or extended fully out.

It has been found by the inventor, however, that mere pivoting around the center axis of the seat has some limitations. And, the greater flexibility of the two arm arrangement of U.S. 2009/0321186 is somewhat difficult to accurately articulate. Sometimes the two arms fold in the right direction; sometimes they do not. It also is quite complex in structure and costly. There is also some concern over how well it supports the full weight of a person in the fully extended position.

As can be appreciated by those with skill and experience in hunting and photography, factors including but not limited to ease, flexibility, smoothness, and efficiency of movement from a seated position can be extremely beneficial. Therefore, there is always room for improvement along these lines. It would be beneficial to have good control over freedom of movement in a seat while being supported either elevated or on the ground but also promote smooth and low effort operation, with minimal movement to achieve different directional tasks. Less movement to turn to different orientations while seated can result in better hunting or picture taking.

The inventor has therefore found there is room for improvement in the art.

SUMMARY OF THE INVENTION

It is therefore a principal object, feature and advantage of the present invention to provide an improved seat of this type that solves the problems or improves over deficiencies in the state of the art.

Other objects, features, aspects or advantages of the present invention include a seat that is relatively portable and can be used with a variety of supporting bases, either from a horizontal surface or a vertical or elevated structure, which:

a. provides a substantial degree of freedom of movement for the user relative the base;

b. is robust;

c. is relatively economical to make, assemble, and use;

d. is advantageous for hunting or photography or other uses;

e. can provide change in direction or orientation of a person on a seat with efficient and sometimes less movement;

f. can provide effective and efficient change of orientation or direction of a person on a seat in a smooth and effective manner;

g. has flexibility as to how it is supported vertically along some elevating natural or manmade structure or supported on the ground by some natural or manmade structure;

h. can be used in single seat mode or in plural seat mode;

In one aspect of the invention, a portable seat assembly comprises an elongated arm having a proximal end pivotally attached to a base and a distal end, a seat mount pivotally attached to the distal end of the arm around a second pivot axis, and a seat mounted on the seat mount eccentrically from the second pivot axis.

In another aspect of the invention, the elongated arm is pivotal in generally a horizontal plane over a range of movement while the seat is eccentrically rotatable around a generally vertical axis. One benefit of the seat is it allows a user to pivot around his/her feet instead of having to move the person's feet around the person. This can allow movement in a variety of different directions on a much smaller area or platform. This can be beneficial for cost, portability, and ease of use.

In another aspect of the invention, the portable seat assembly includes a second elongated arm pivotally attached to the base and a seat eccentrically pivotally attached to the distal end of the second arm around a pivot axis.

In another aspect of the invention, the portable seat assembly includes adjustment features to assist in mounting it at or near horizontal.

In another aspect of the invention, the portable seat assembly can be combined with such things as tree stands, ladders, tripods, and shooting sticks.

These and other objects, features, aspects and advantages of the present invention will become more apparent with the accompanying specification.

BRIEF DESCRIPTION OF THE DRAWINGS

FIG. 6 is similar to FIGS. 5A-C but shows the seat of FIG. 1 mounted on a ground stand instead of along the side of a tree.

FIG. 9 is a top plan view of an alternative embodiment of the invention utilizing a single backbone assembly for mounting to trees or other vertical structures but having two eccentrically mounted seat assemblies for two users.

FIG. 10 is a front elevation of the double seat embodiment of FIG. 9.

FIG. 15 is an enlargement of the adjustable angled legs at the bottom of the ladder of FIG. 13.

DETAILED DESCRIPTION OF EXEMPLARY EMBODIMENTS

Overview

Figure 1:
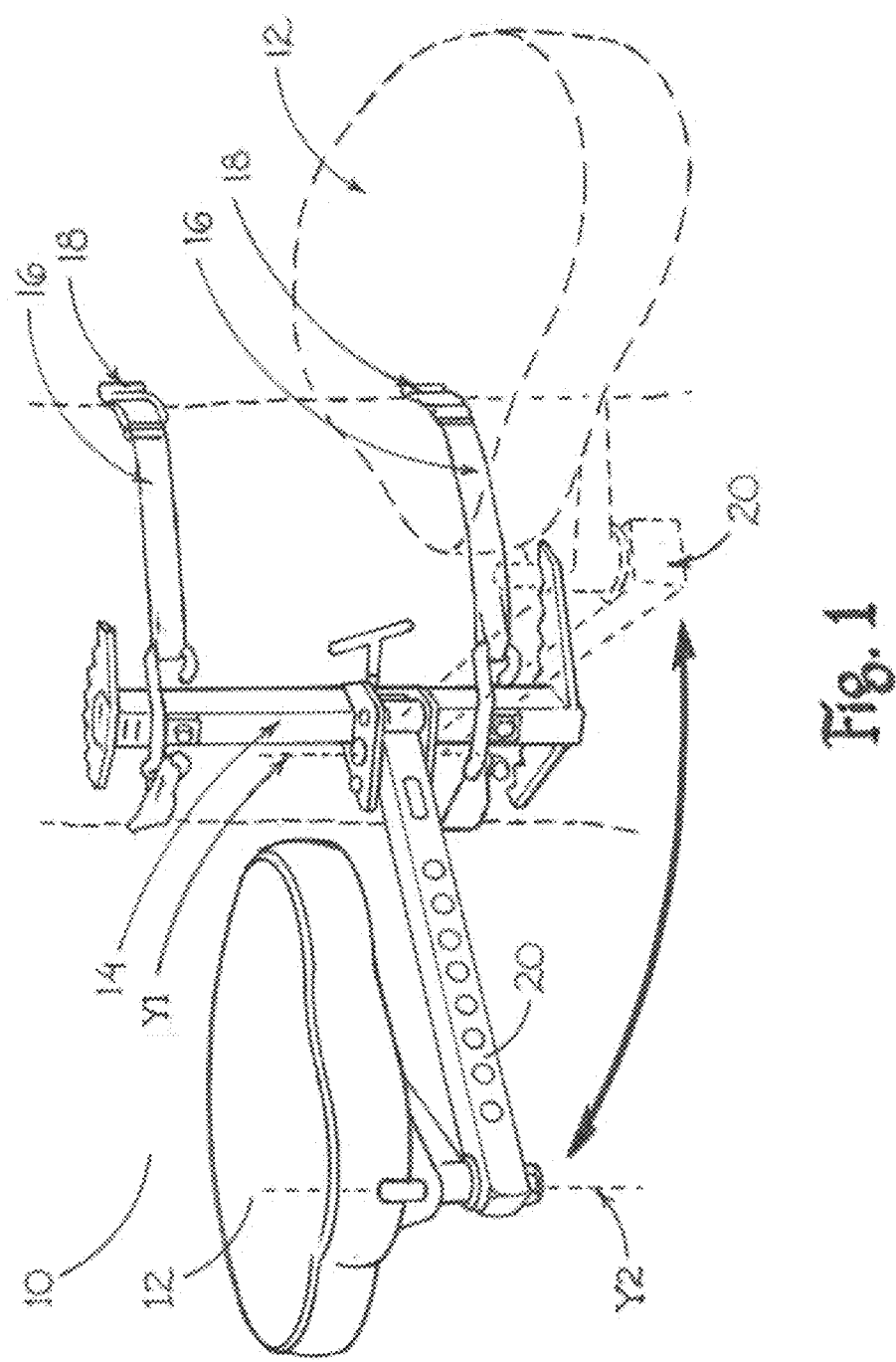
FIG. 1 is a perspective view of an exemplary embodiment of a seat assembly according to the present invention mounted along a tree and including in ghost lines an indication of freedom of movement of the seat assembly.

For a better understanding of the invention, a detailed description of exemplary embodiments according to aspects of the invention will now be set forth. Frequent reference will be taken to the figures. Reference numerals will be used to indicate certain parts and locations in the figures. The same reference numerals indicate the same parts and locations throughout the figures, unless otherwise indicated.

Some exemplary embodiments are shown and described in the context of a tree-mounted seat where a mounting mechanism 14/16/18 mounts along the trunk of a tree as an elevating base or support. It is to be understood that the invention can be applied to other bases or supports. For example, principles of the tree-mounted seat can be incorporated into a vertical ladder. Other examples would be a self-supporting vertical double ladder, some sort of a chair base (including portable quad-legged or tripod bases). Other examples include attachment of base 14 to a tree stand (a stand mounted high up in a tree that allows a hunter to stand). A variety of such are commercially available. Base 14 would simply have to be configured to bolt or otherwise fasten securely to such a tree stand. Alternatively, the strap(s) and cinch members 16, 18 of FIG. 1 could be used to secure the exemplary embodiment seat assembly along a tree trunk or other vertical structure at the level of a tree stand. Another example could be attaching base 14 to some sort of ground supported base, chair, or tripod in a hunter's blind.

A main feature of the exemplary embodiments is a generally horizontal arm 20 having a first vertical pivot axis Y1 at the base and a second vertical pivot axis Y2 at or near an opposite distal end. The seat is mounted to a plate or other support that rotates about vertical pivot axis Y2 at that distal end of the generally horizontal arm. The seat's center is offset or eccentric to that second vertical axis Y2. Therefore, not only can the horizontal arm 20 pivot side to side over an angular range relative vertical axis Y1 for one degree freedom of movement, seat 12 itself can rotate around second vertical axis Y2 in an eccentric way for a second degree of freedom of movement. Such rotation of seat 12 around axis Y2 can be 360°. It has been found that this allows the seat to be rotated between positions over horizontal arm 20 (to kind of collapse the device to its smallest size) and then away from being over arm 20 (to extend not only side-to-side but out and away). It can be pivoted away from the arm in either direction for a number of positions. Such positions can be achieved quickly, smoothly, and easily for beneficial flexibility to the user. For example, a hunter can efficiently and quickly change positions smoothly and relatively easily, which can be important. The eccentric nature of rotation of the seat around vertical pivot axis Y2 in combination with the ability to pivot horizontal arm 20 over an angular range relative to the tree or other support around vertical axis Y1 allows the hunter or photographer to twist his or her torso to get a highly flexible range of different torso orientations without much movement of a person's lower body. This can greatly assist in smoothness and minimization of movement of the body which has obvious benefits regarding hunting and picture taking.

First Exemplary Embodiment

FIG. 1 shows an example of a base or backbone 14 of a seat assembly 10 that can be mounted along a tree 8 with a strap 16 and ratchet 18 system. These types of bases and ratcheted straps are available from a variety of different commercial sources. Those depicted in FIG. 1 are relatively small and economical, and straight forward and flexible to use. Strap(s) 16 can adjust for a variety of tree diameters. A seat 12 is mounted at the distal end of horizontal arm 20 which has a proximal end that is pivotally mounted to the base 14. As shown in FIG. 1, a first degree freedom of movement around vertical axis Y1 is at the proximal end of arm 20. The second degree of freedom of movement around vertical axis Y2 is at the distal end of arm 20.

Figure 2:
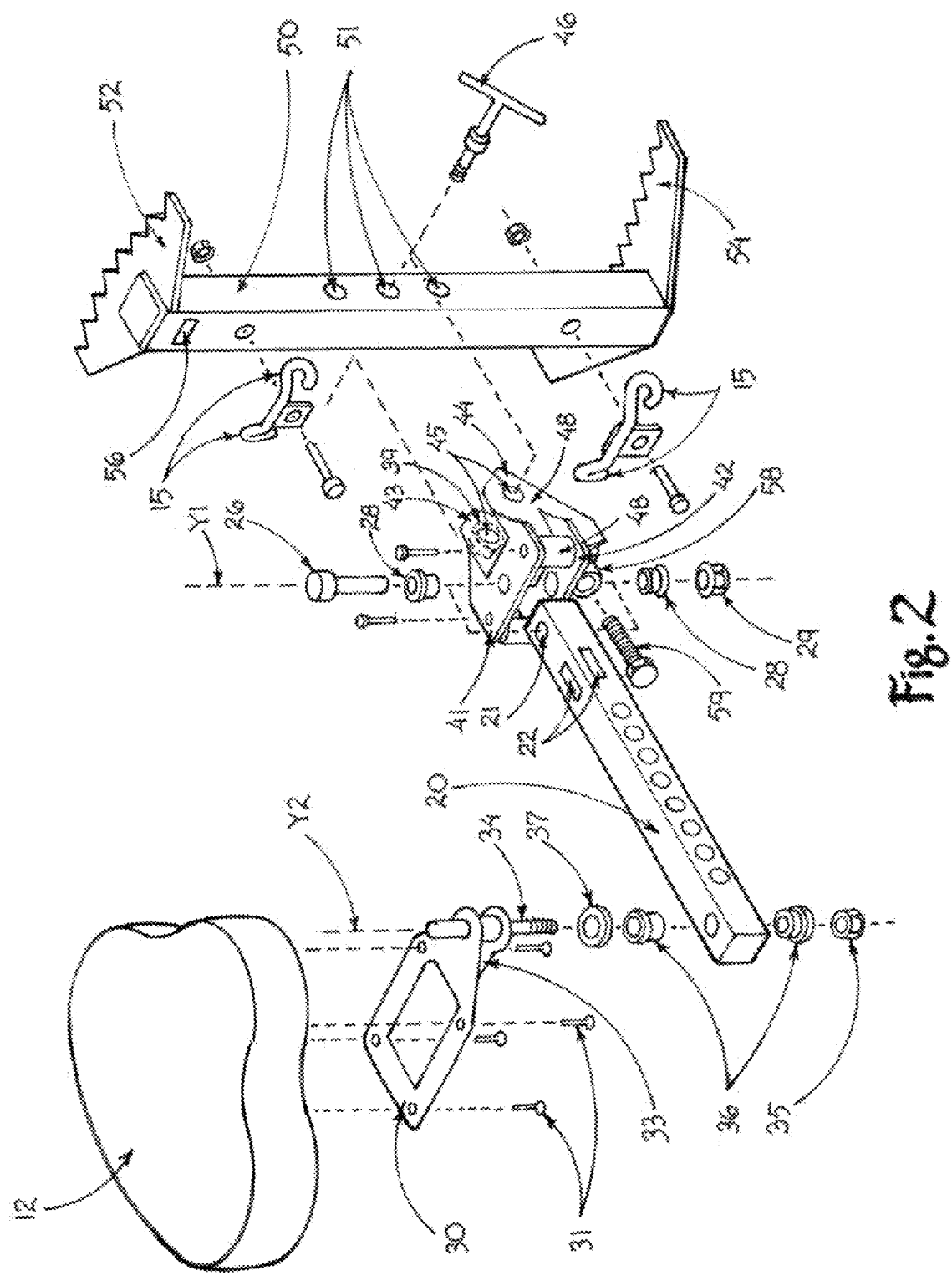
FIG. 2 is an exploded view of components of the embodiment of FIG. 1.
Figure 3:
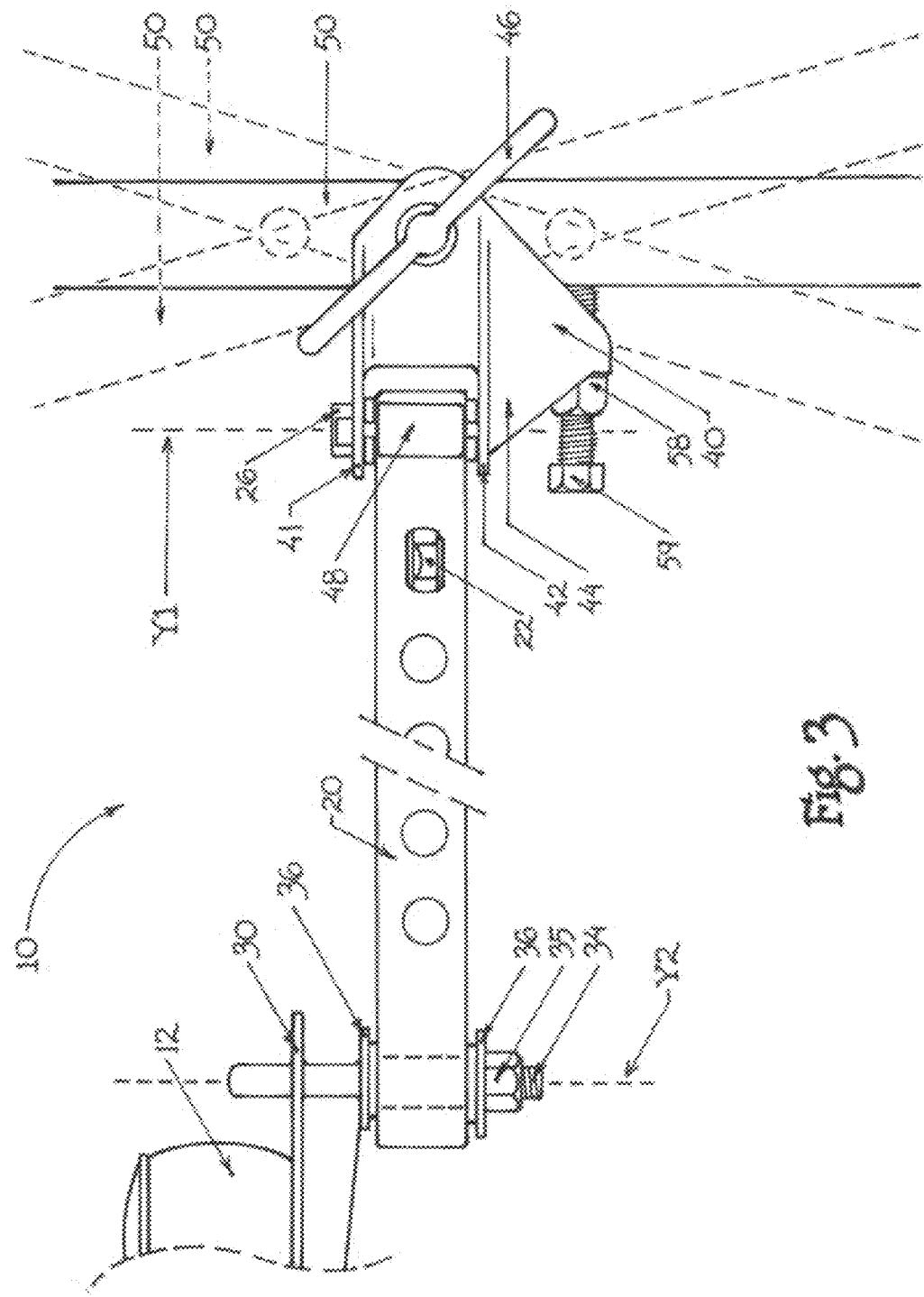
FIG. 3 is an enlarged side elevation view of the embodiment of FIG. 1 showing in ghost lines the ability to adjust angular orientation of the seat relative a tree or other mounting structure in the vertical plane.
Figure 4:
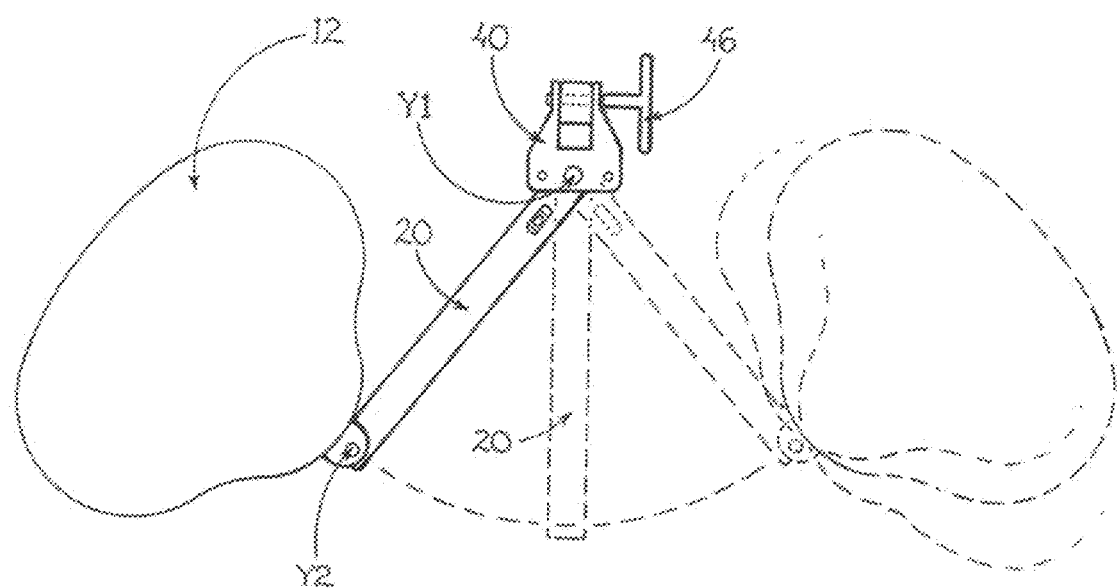
FIG. 4 is top plan views of different exemplary positions of the seat of FIG. 1, showing a variety of positions around a first rotational axis Y1 for a given position of horizontal arm 18. A few different rotational positions of seat 12 around rotational axis Y2 are shown in ghost lines on the right side.

By referring to FIGS. 2-4, more details about specific structure of the total assembly 10 can be seen. Details about base 14 and strap 16 will not be set forth here as a variety of different bases and mounting straps or other structure can be used. As indicated in the Figures, base or backbone 14 must be of strong and durable structure and materials to support the cantilevered horizontally extending arm 20 and rotating seat 12 extending away from base or backbone 14. It can be beneficial that some sort of edge or extension from base or backbone 14 assist in centering base or backbone 14 along a vertical supporting structure such as a tree 8. This could include teeth or a serrated edge, or some pin(s) or spike(s) that could penetrate a tree to help hold a position (see FIG. 2). As indicated in FIG. 1, strap 16 has a length that can circumnavigate tree 8 or other vertical supporting structure and have opposite ends that are attached to base or backbone 14. Some type of ratchet or cinching mechanism 18 (commercially available) can be interposed along the length of strap 16 to both allow lengthening or shortening of its length and provide mechanical advantage to tightly cinch strap 16 around tree 8 or other vertical supporting structure. A wide variety of such straps and cinches are available so further details will not be discussed here. Examples of materials for strap 16 can be natural or synthetic webbing that is flexible but does not elongate along its longitudinal axis more than minimally and can again support not only the mass of the seat assembly 10 but also the mass of someone sitting on the seat and the forces that can be experienced in moving around. As further noted in FIG. 1, two straps 16/ratchet 18 combinations are used in spaced apart positions along backbone 14. One is possible. Eye hooks 15 are bolted to backbone 14 and can received looped opposite ends of each strap 16. Other attachment methods of strap to backbone are possible.

As can be seen, arm 20 can be a metal tube (e.g., 1¼"×1¼"×14½"). It can be different sizes and materials.

FIG. 1 shows how backbone 14 can be strapped and cinched along tree 8. Outwardly extending cantilevered arm 20 extends from backbone 14. Rotating seat 12 (rotational in generally a horizontal plane around axis Y2) is mounted at the distal end of arm 20. Arm 20 can pivot (see arrow in FIG. 1) over a range in a generally horizontal plane around axis Y1.

FIG. 2 shows the structure that allows this combination. Backbone 14 includes an elongated tubular member 50 (1¼" by 1¼" by 15") having what will be called a top claw 52 at one end and a bottom claw 54 at the other. Claws 52 and 54 have teeth or serrated backward extending edges that can bite into tree 8. FIG. 2 shows them having essentially a serrated or toothed straight edge. Alternatively, it can be slightly curved in a convex or concave manner. Still further, it could be V-shaped to help center the backbone 14 on the tree. Other shapes or configurations are possible.

Another feature of tube 50 is an opening along its front side through which can be seen a bubble level 56 mounted inside tube 50. Bubble level 56 can be mounted transversely and thus help the user install backbone tube 50 and align it along a vertical plane even if tree trunk 8 is not vertical. It can be important to mount backbone 14 as vertically as possible to promote the best freedom of movement pivoting in rotation of arm 20 in seat 12.

FIG. 2 shows further that in this embodiment, eye hooks 15 for straps 18 can be separate pieces that are bolted through tube 50 as shown. Alternatively, they could be welded in position or mounted or attached in other manners.

FIG. 2 also shows that cantilever arm 20 can be mounted at different positions along tube 50. In this example, three sets of openings 51 along tube 50 allow a bolt/T-handle 46 to be extended through ears 43 and 44 of bracket 40 when holes 45 and ears 43 and 44 are aligned with a set of openings 51 in tube 50. A nut 39 can receive the threaded end of bolt/T-handle 46 to secure cantilevered arm 20 at that position. It is to be understood that just one set of holes 51 and tube 50 could be used or more than three. Still further, bracket 40 or, for that matter, arm 20 could be welded or rigidly fixed along tube 50.

A nut can be welded on the lateral side of ear 43 around hole 45. In that fashion the threaded end of T-handle 46 can be threaded into the nut. That nut can be a nut 39 welded or not, or bore 45 can be threaded to receive the threaded end of T-handle 46. An enlarged portion along T-handle 46 would abut the lateral side of ear 44 when threaded end of T-handle 46 is threaded into nut 39 or threaded bore 45. Further turning of T-handle 46 would pull ears 43 and 44 together for a tight fit on opposite lateral sides of tube 50. It would basically squeeze together ears 43 and 44 to clamp against tube 50. This can be beneficial as opposed to simply putting a cotter, key or pin through an unthreaded end of T-handle 46 to secure in place. The clamping or squeezing action can not only help structurally but can reduce noise caused by shifting of a person on the seat, which can be a beneficial feature in hunting or outdoor photography situations. But, alternatively, nut 39 could be separate or opening 45 and ear 43 could be threaded which would eliminate the need for nut 39.

FIG. 2 also shows that bracket 40 includes horizontal plates 41 and 42 that are spaced apart and from which ears 43 and 44 extend rearwardly. Plates 41 and 42 have an aligned set of openings 47. Bolt 26 can extend through those openings 47 when a set of openings at the proximal end of cantilever arm 20 are aligned to secure cantilevered arm 20 to bracket 40 but allow pivoting around bolt 26 (which also would define vertical axis Y1). Bushings 28 (brass, nylon, or other) could fit on opposite sides of the proximal end of arm 20 between those surfaces and the interfacing surfaces of plates 41 and 42 to be bearing surfaces for pivoting of arm 20. Nut 29 would hold bolt 26 in place.

FIG. 2 also shows that nylon, rubber, brass, or other material bumpers or rollers 48 could be fastened by bolts and nuts through openings 49 in plates 41 and 42 on opposite sides of arm 20. They would essentially act as mechanical stops to define the range of side-to-side pivoting motion of arm 20.

Thus, FIG. 2 illustrates how generally horizontally extending arm 20 could be mounted to bracket 40 and then bracket 40 mounted to various positions along tube 50 of backbone 14 for one type of adjustability of the assembly 10.

FIG. 3 shows another aspect of adjustability. Sometimes whatever structure bracket 40 is attached to is not perfectly vertical. A threaded nut 58 can be included on bracket 40. Alternatively it could be a threaded bore in bracket 40. Here it is at the bottom along a generally vertical wall spanning ears 43 and 44 along the underside of lower horizontal plate 42. A threaded bolt 59 can be threaded through that threaded nut or bore 58 (it could simply be a nut welded or fixed to bracket 40) such that the threaded stem of bolt 59 can extend towards tube 50. That end of bolt 59 can be moved inwardly by turning bolt 59 until it abuts the front facing side of tube 50. As indicated in FIG. 3, this allows the angle of cantilever arm 20 to be adjusted in a vertical plane relative to the front face or longitudinal axis of tube 50. As shown in solid lines in FIG. 3, if tube 50 is perfectly vertical, bolt 59 would be threaded in until it comes into abutment with tube 50 when arm 20 is horizontal. Even if tube 50 is not precisely vertical, this can hold arm 20 horizontal. As indicated in FIG. 3, arm 20 can have openings on one or more faces inside of which a bubble level 22 is mounted in view. This would allow the user to have an easy and immediately perceivable indicator of when arm 20 is horizontal.

FIG. 3 also shows in ghost lines that if tube 50 is oriented other than vertical, arm 20 can be moved to horizontal (e.g., by viewing level 22) and then bolt 59 threaded inwardly or outwardly until it comes into abutment with the front facing side of tube 50. This would also hold arm 20 in that horizontal leveled position even though backbone tube 50 is not. This is another level of adjustability to try to keep arm 20 horizontal for better functioning of arm 20 and seat 12.

FIG. 4 shows from a top view an indication of range of side-to-side horizontal movement of arm 20. Again, rollers or bumpers 48 (FIG. 2) would act as mechanical stops defining that range of angular motion. FIG. 4 also illustrates some of the degree of freedom of movement of seat 12. The left image of arm 20 and seat 12 shows how the eccentric mounting of seat 12 at the distal end of arm 20 and its eccentric mount at pivot axis Y2 allows it to be rotated in that position. The other solid line image to the right is an alternative position for arm 20 and rotation of seat 12. The ghost lines at the right then indicate how further freedom of movement seat 12 is possible. Bolt 26 extends between horizontal upper and lower plates of base 14 and through holes in the proximal end of tube 20 and is secured in position by nut 29. Bushings or washers 28 space tube 20 from the horizontal plates and provide lower friction for pivoting of tube 20. At the opposite or distal end of tube 20 through-holes 24 can receive a bolt 34 having one end fixed to the seat and an opposite lower end extending below tube 20. Bushings 36 (e.g. brass, nylon or other) can be fitted inside tube 20 and bolt 34 extend through them. A washer 37 can also reduce friction. Nut 35 can secure that combination together. This allows attachment of the seat to the distal end of tube 20 but allows it to rotate around that axis Y2.

FIGS. 2 to 5A-C diagrammatically show additional details regarding seat 12. A main support plate 30 of somewhat similar shape to the seat 12 has multiple apertures that correspond to four threaded receivers in the seat bottom that allow seat 12 to be mounted by screws 31 into those threaded receivers. Alternatively, seat 12 can be screwed or otherwise attached to bracket 30. Seat 12 can take many configurations. In the exemplary embodiment its bottom is essentially a wood plate with fabric and foam cushioning to form the seat and the seat back. Bolts or screws 31 would fix seat 40 to plate 30. As shown in FIG. 2, bolt 34, bushings 36, nut 35 and washer 37 will be combined along axis Y2 to mount combined plate 30 and seat 12 to beam or arm 20 but with the center of 12 eccentric or spaced from axis Y2.

Figure 5A:
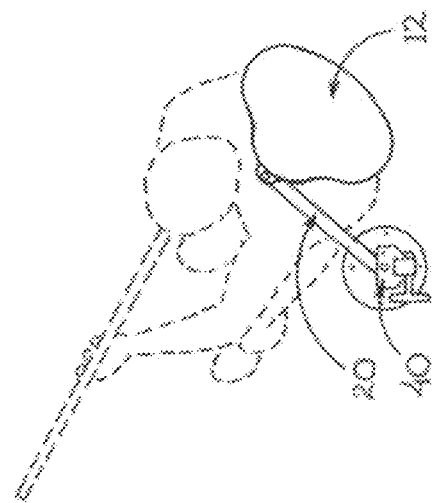
FIGS. 5A-C is the embodiment of FIG. 1 showing in top plan views a hunter (in ghost lines) pivoted to different directions by pivoting the seat around rotational axes Y1 and Y2.
Figure 5B:
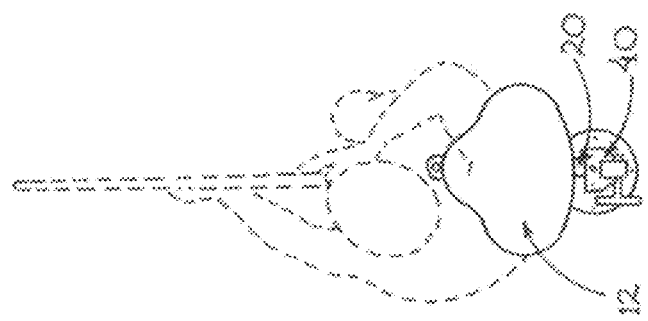
Figure 5C:
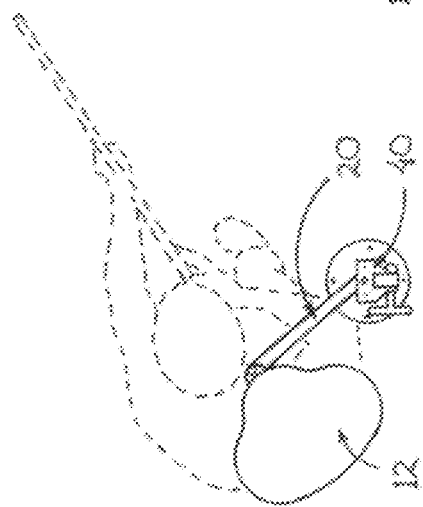

As illustrated in FIGS. 4 and 5A-C, axes Y1 and Y2 allow seat 12 to be pivoted with arm 20 sticking straight out from the tree but the seat 12 pivoted back on top of and basically covering part of arm 20. FIG. 4 shows seat 12 pivoted approximately 50° either way from the straight out position of FIG. 3. FIGS. 5A-C show different positions of seat 12 and arm 20; illustrating in ghost lines a hunter. These views show the flexibility of pivoting around that one degree freedom of movement of Y2 but also changing the angular direction of arm 20. The eccentric mount of seat 12 to beam 20 allows high flexibility. An example would be the shooter could rotate the seat 12 in different directions for a left or right shot without moving the shooter's feet. If a large movement is desirable (for example to shoot behind the tree), the user's feet would probably have to move but may not have to very much.

FIG. 4 illustrates that pivot axis Y2 is at or near the distal end of arm 20 and at the very periphery of seat 12. This allows seat 12 to be pivoted around Y2 theoretically 360° of rotation. In a position where seat 12 is nearest the tree trunk, seat 12 would basically cover the top of arm 20. In the farthest away position, it extends away from the end of arm 20.

As can be appreciated, as illustrated in the Figures, a hunter can rotate or pivot seat 12 around pivot axis Y2 for a variety of convenient aiming directions. This provides a high degree of flexibility of positioning for the hunter. It has been found that this off-center mounting of seat 12 at the end of arm 20 (for example, 7¼" off center from the center of seat 12 to the center of pivot for a 14" diameter seat) allows almost 360° pivoting of the hunter with minimal effort and high control. The mounting base or backbone 14 that is cinched and clamped against the tree trunk, and the robustness of arm 20 and its connection to base 14, allows support of hunters of several hundred pounds or more. Essentially, there are two degrees freedom of movement of the hunter based on just a single arm 20 at a pivot axis at or near base 14.

Importantly, embodiment 10 not only provides these subtle combinations of user-selectable movements when the seat is attached to tree 8, its setup is beneficial in that built-in levels 22 and 56 allow both vertical positioning of backbone 14 on tree 8 (e.g. when cinching it) and then (in combination with adjustment bolt 59) fixing arm 20 in horizontal plane.

The components allow various modes of installation of assembly 10. In one example, backbone subassembly 14 can first be strapped to tree 8 with reference to bubble level 56 for vertical alignment. Then seat 12, arm 20 and bracket 40 (previously assembled), can quickly be mounted along backbone 14 by use of T-bolt 46 and simple alignment of bracket 40 along tube 50 and insertion of T-handle 46. Instead of nut 39 separate from bracket 40, it could be welded to ear 43 so that all the user needs to carry is T-handle 46 as a separate piece. T-handle 46 could be chained or attached in a manner to bracket 40 to deter its loss. Then, when bracket 40 is attached to tube 50 the user can reference built-in bubble level 22 on arm 20 and adjustable 59 for horizontal positioning of arm 20.

Built in levels on seat assembly 10 allow for effective and efficient visual indication of positioning of arm 20 relative to ground. As mentioned, this allows the user to have a visual reference while manually adjusting the seat during installation for preferred positioning.

Figure 8:
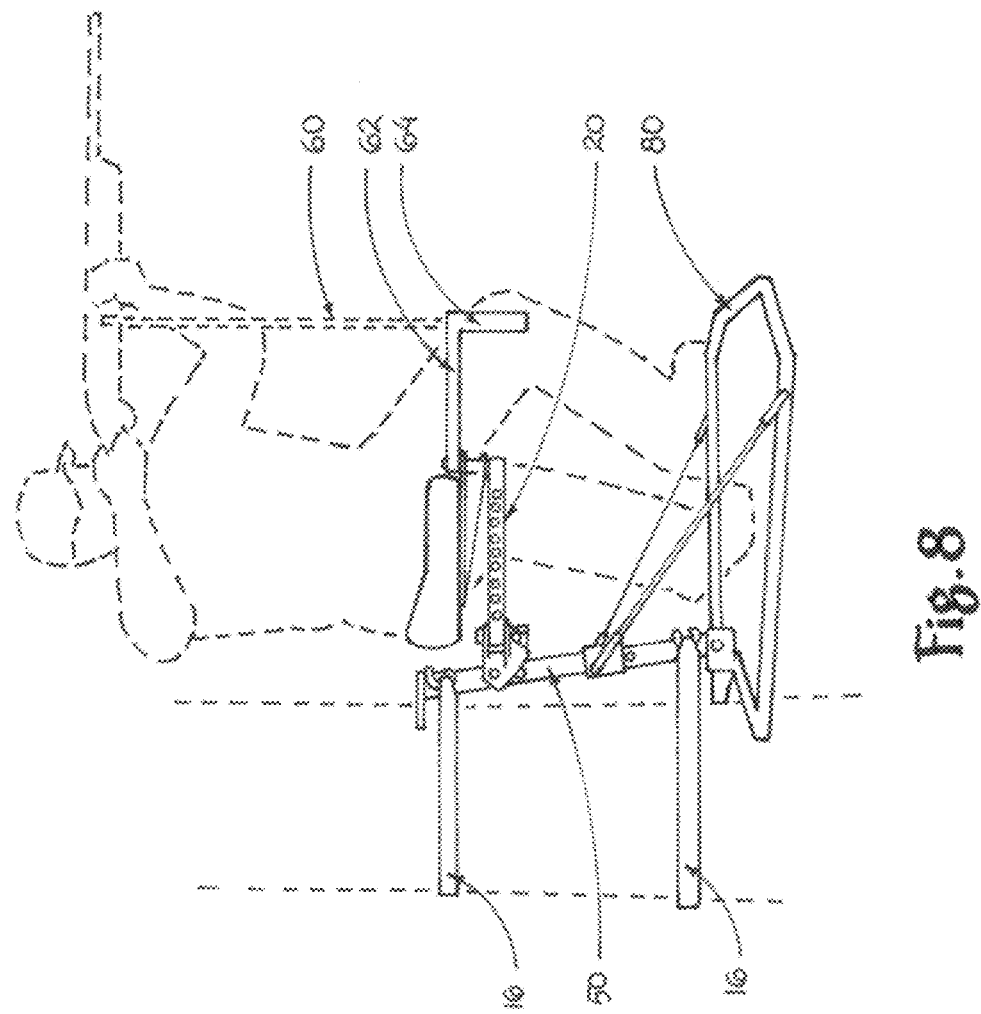
FIG. 8 is a side perspective view of the seat assembly with adjustable foot rest of FIG. 7A-C, showing an additional optional shooting stick or camera support stick accessory.

An optional feature for the hunter's seat of FIGS. 1 to 5A-C is shown at FIG. 8. An additional rigid arm 62 can extend from seat support 30. At the end of arm 62 can be a vertical receiver 64 (e.g., having a rubber tube inside it to receive the end of a shooting stick 60). Arm 62 can be rigidly attached to seat support 30 so that it rotates with rotation of seat support 30 around axis Y2. Shooting stick 60 can be custom made or can be a commercially purchased stick having a free lower end that can fit within receiver 64. As can be appreciated, arm 62 and receiver 64 can be made of different materials and configurations. It provides the ability for a vertical member such as a shooting stick, or a camera support stick, to be effectively utilized with eccentrically rotatable seat 12 and pivoting arm 20.

Figure 11:
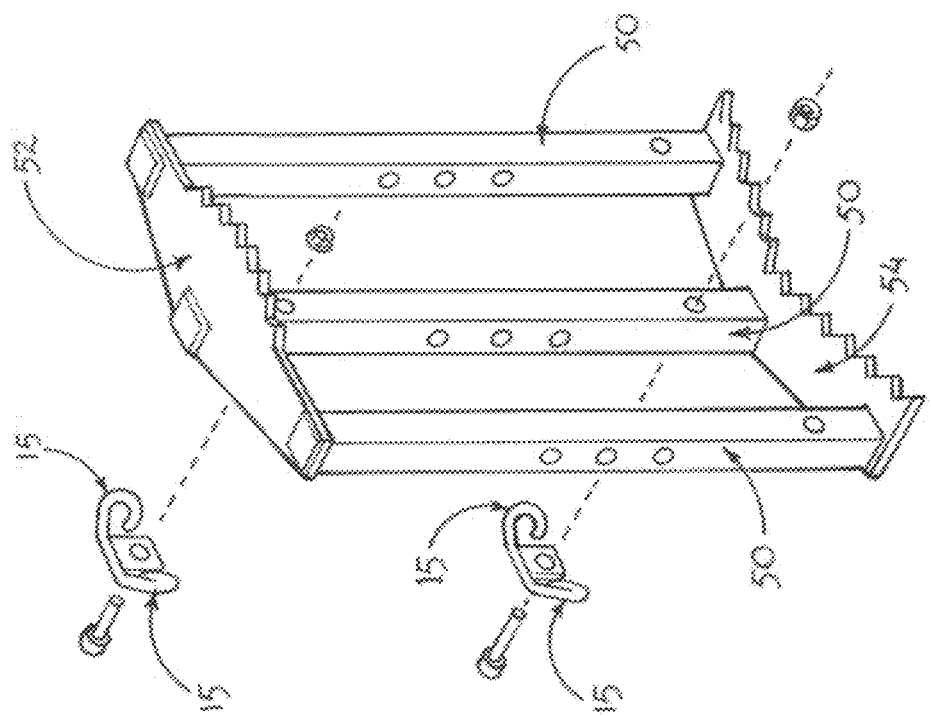
FIG. 11 is an enlarged isolated and exploded view of the backbone of FIGS. 9 and 10.

FIGS. 9 and 10 show an alternative possible embodiment according to the present invention. As shown in FIG. 9, this would allow a second seat with the same degrees of freedom of movement as seat 12 of FIG. 1 from the same base or backbone. As can be seen in FIGS. 9-11, first cantilever arm 20' would extend from essentially the same bracket as bracket 40 of FIG. 2. The second cantilever arm 20" would do likewise from a second bracket like bracket 40 of FIG. 2.

FIG. 11 shows a modified backbone 14 for this optional embodiment. Similar to backbone tube 50 at FIG. 2, a central tube 50 would extend from upper jaw 52 to lower jaw 54. Those jaws would be expanded laterally and help support similar tubes 50' and 50" spaced apart on opposite sides of middle tube 50. Middle tube 50 can have brackets with hooks 15 for connecting opposite ends of a cinching strap such as in the embodiment of FIG. 1 the strap that will backbone assemble FIG. 11 to a tree or other structure. Each of the tubes 50, 50', and 50" could have one or more sets of apertures along their length as a mounting point for T-handle bolt 46 through ears 43 and 44 of a bracket such as bracket 40 of FIG. 2. This allows placement of one, two, or perhaps even three seat assemblies 10 of FIG. 2 to the backbone of FIG. 11. But as shown in the example of FIGS. 9 and 10, two seat assemblies 12' and 12" on cantilever arms 20' and 20" can be mounted at opposite outer vertical tubes 50' and 50" and can operate at least partially together regarding the range of freedom of movement of the seat assembly 10 of FIG. 2.

It therefore can be seen that this combination provides a high degree of freedom of adjustment or movement but with relatively simple and robust parts. Bracket 40 can be strengthened by gussets and the materials of bracket 40, bearings, bolts, backbone 14, and arm(s) 20 can be selected to support a wide range of weights, on the order from under 100 pounds to over 300 pounds or more. By appropriate selection of materials and their preparation (e.g., painting, galvanizing, and the like), they can be ruggedized for outside use. Likewise the fabric cover of chair 12 can be ruggedized for outdoor use.

Again, as can be appreciated by the foregoing, the combination of freedom of movement features of seat assembly 10 promotes efficient and effective adjustment of orientation of a person on seat assembly 10. For example, as illustrated in FIGS. 5A-C, 6, 7A-C, and 8, a hunter can quickly, smoothly, and efficiently change positions over a substantial range over a very small area. The eccentric seat allows pivoting around the person's feet instead of having to move the feet around the person. This allows efficient movement in a much smaller area or platform which can be substantially beneficial.

Options and Alternatives

As can be appreciated, arm 20 and seat 12 can be mounted to other bases. This can include a ground mounted chair-type base, a ladder on the ground, a ladder supported to a tree, in a hunting blind, on a vehicle, or the like. The mounting should be robust enough to support the seat for its intended use and its degree of freedom of movements.

FIG. 6 illustrates this concept. A ground supported chair 70 could include a center vertical post 71 to which backbone 14 could be strapped or cinched. Alternatively, vertical support 71 of chair 70 could simply have bracket 40 attached to it along its length. Outwardly extending legs 72 would provide ground contact in support for the chair. A still further optional feature would be instead of connecting arm 20 to bracket 40 with less than 180° side-to-side angular range of motion, arm 20 could be attached to center tube 71 to allow 360° rotation or at least over 180° as shown. This, in combination with the eccentric rotation ability of seat 12 on arm 20, allows for the types of change in upper body orientation of a hunter as shown in FIG. 6.

Figure 7A:
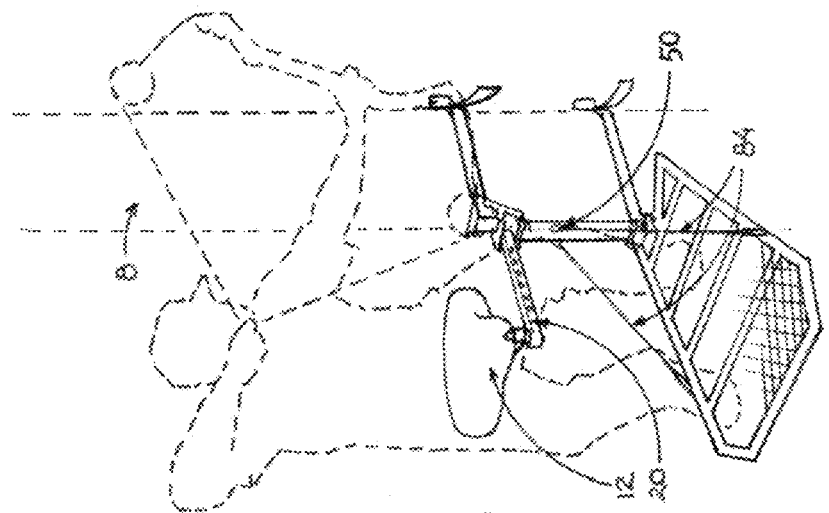
FIGS. 7A-C are perspective views of an alternative embodiment according to the invention showing the seat rotated or pivoted to different positions.
Figure 7B:
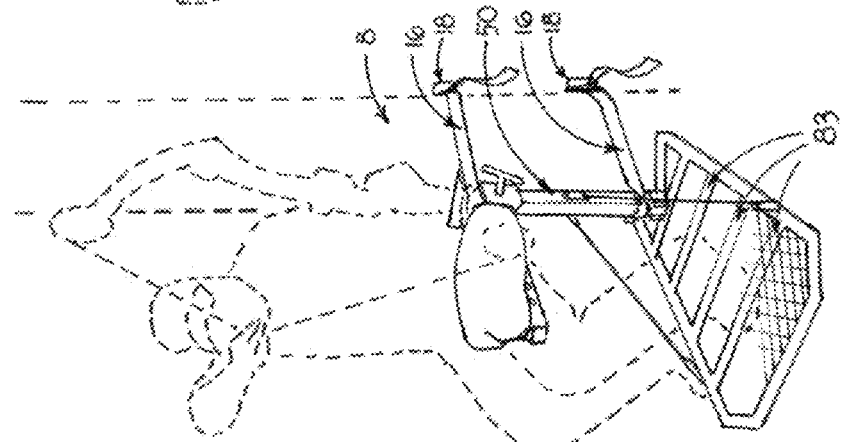
Figure 7C:
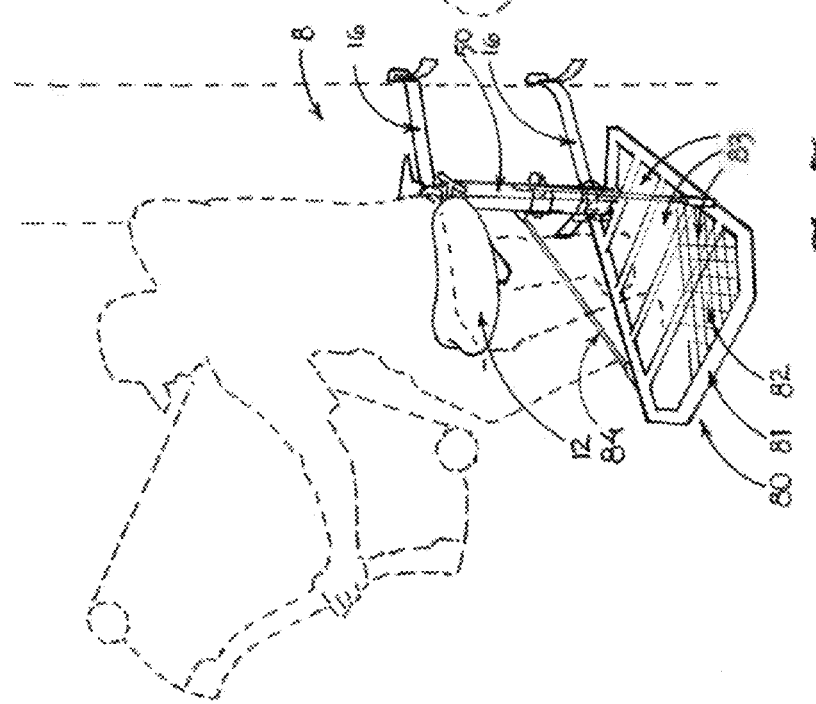

FIGS. 7A-C show additional alternative or operational features according to aspects of the invention. The lower end of backbone 14 could be attached a foot rest 80 (essentially a tree stand). This can be beneficial especially when seat assembly 10 is mounted off of the ground such that the user's feet do not touch the ground.

Foot rest 80 in this embodiment has an outer tubular metal frame 81, cross bars of tubular metal 83 and then metal mesh 82 fixed to or over those structural members. As can be appreciated from FIGS. 7A-C, foot rest 80 could be placed at the bottom of backbone 14 or it could replace the lower jaw 54 of FIG. 2 with a V-shape at the back of foot rest 80. Still further, that V-shape back edge could include a serration, teeth, or other projections to help stabilize it.

Still further, backbone tube 50 could have multiple sets of openings at the lower end to allow for different mounting positions of foot rest 80 relative to the plane of seat 12. This could be another adjustment feature that could be varied according to need or desire. For example, different height hunters might want foot rest 80 spaced farther apart from seat 12 than shorter members. Additionally, the method of attachment of foot rest 80 to backbone tube 50 could vary. It could be hingeably adjusted so that it could be folded up against backbone tube 50. Other supporting members could be used such as cables that would extend from backbone tube 50 out to the opposite left and front distal edges of frame 81 (see cables 84 shown diagrammatically in FIGS. 7A-C). The mesh 82 can be beneficial as it allows hunters or photographers to see down through foot support or deck 80. It could be expanded metal, or other materials and configurations sufficient to support the weight and forces of a range of conventional sized persons wanting support of this type. Another example would be a solid foot support platform with apertures through it.

Weight-saving features can be built into the assembly. As shown in FIGS. 1-3, apertures or openings 23 can be formed along arm 20 to reduce weight. Similar effects could be made for other components without sacrificing needed structural characteristics.

As indicated earlier, built-in bubble levels or analogous components can provide easy direct visual feedback for helping the user to plum vertical backbone as close as possible (sometimes it is not trivial to do depending on the nature of the tree or elevating structure and its verticality or not), as well as the fact sometimes these adjustments are being attempted at tens of feet in the air. It can help get it as plumb as possible. Bubble level in cantilever arm 20 can be used in a similar manner to get the arm 20 as close to horizontal as possible.

Another possibility for foot support 80 is that it be attached to essentially a complimentary tube that could be slideably inserted in the lower end of backbone tube 50 and fixed into position by a cross bolt or pin such as T-bolt 46 of FIG. 2. See also FIG. 8. As mentioned previously, there could be multiple sets of matched apertures along that extended slidable tube that would allow for different spacings of the foot support 80 relative to the seat 50.

It can furthermore be appreciated that in one form all the features described herein could be possible in a single assembly 10. The customer can purchase seat 12. It could be mounted along a tree or pole at or near ground level where the hunter can simply stand on the ground to get on and off seat 12. Or it could be mounted higher up along the tree where the hunter would need to utilize a ladder or the like to reach that position, install seat assembly 10 and utilize it.

Seat assembly 10 could be sold alone or with options. A kit could include seat assembly with backbone tube 50 with claws 52 and 54. Claws 52 and 54 could be removable or a different backbone 50 sold with the kit for use, for example, for mounting on a ground support, such as a chair or tripod.

Still further, a feature that could be utilized with the basic concept of eccentric seat 12 and pivotable arm 20 is mounting tube 50 along the side of a ladder. By reference to FIGS. 12-15, one example of a ladder 110 is shown. The features of ladder 110 include that it can be broken up into sections for easier transport and storage, it can have a ground-contacting foot assembly that can be adjusted for various terrains (see pointed ends 127 at angled telescoping tubes 126 and 124. Tubes 124 and 126 can be locked into different extended positions by T-bolts 129 (two a side) that thread through threaded bores in tubes 124 and bite into tubes 126). The angling of tubes 124 and 126 (approximately 45°) relative to the longitudinal axis of ladder 110 is a stabilizing feature. It provides a spread base (wider than the ladder rails). It can have bubble levels 180 and 182 to help vertical orientation.

Figure 12:
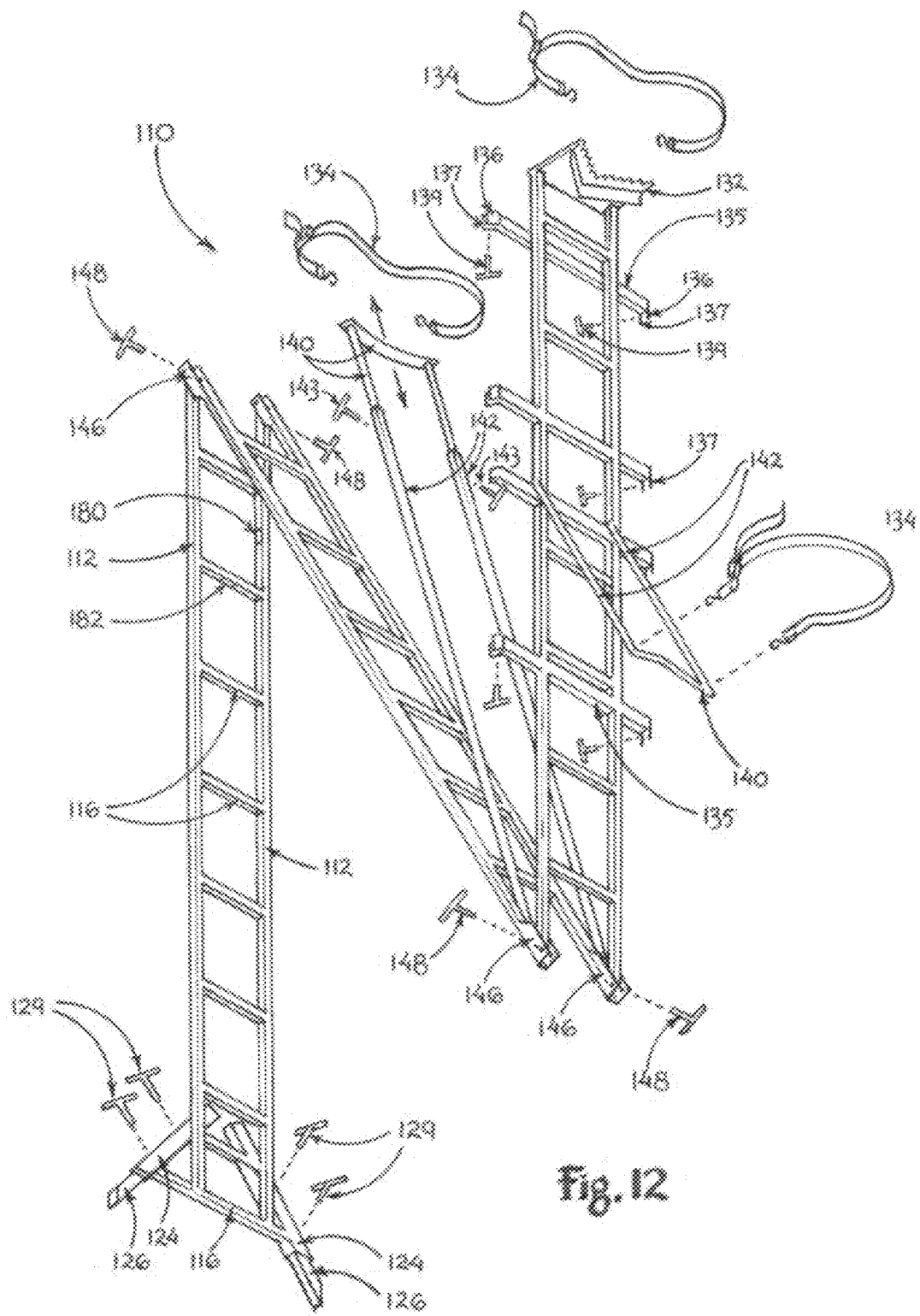
FIG. 12 is an isolated perspective view of a ladder that could be used with one or more of the seat assemblies of FIGS. 1 to 5.
Figure 13:
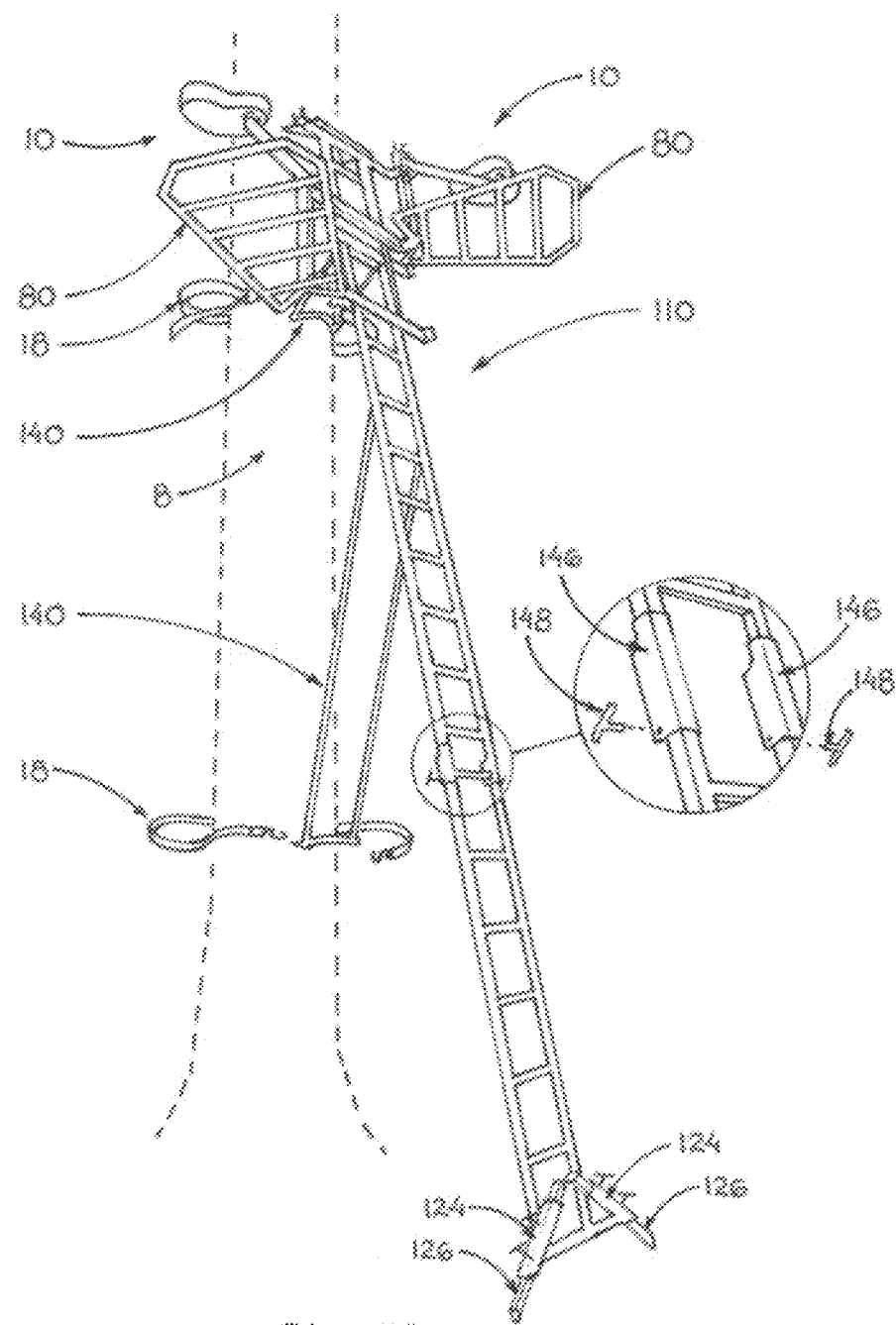
FIG. 13 is the ladder of FIG. 12 extended and locked into extended and installed position along a tree and showing capability of supporting a plurality of tree stands, conventional seats, or the eccentric seats of earlier figures along the ladder. The enlarged insert better illustrates the lockable joint between ladder sections.

FIG. 13 shows how multi-section ladder assembly 110 of FIG. 12 can be extended along a plane from a bottom leg end to a top end. One or more seat assemblies 10 with or without foot rests 80 can be installed along the ladder. Bottom legs (telescoping tubes 124 and 126) at 45° opposite angles to the longitudinal axis of the ladder, have pointed distal ends 127. A level 180 built into ladder 110 can help install or visually adjust legs 126 relative to fixed tubes 124 to get good vertical alignment of the longitudinal axis of ladder 110. It has been found that the pointed ends 127 of legs 126 tend to penetrate and grip the ground but the 45° spread of tubes 124 from the ladder longitudinal axis tends to transfer the forces outwardly to deter the pointed ends 127 from trying to penetrate directly down into the ground. In other words, this combination tends to penetrate and prevent lateral movement of the bottom of the ladder relative to the ground but limit the amount of penetration into the ground to keep the ladder in a stable position. Legs 126 can be telescoped outwardly to account for uneven terrain or the like. Other angles are possible. See enlargement of the lower part of ladder 110 in FIG. 15. Small pieces of steel rod can be welded across one face of extendable legs 126 (as shown in FIG. 15) to serve as mechanical stops to prevent legs 126 from sliding all the way into sleeves 127.

The enlarged insert in FIG. 13 shows how ladder sections can be locked into position by sleeves 146 and T-bolts 148.

FIG. 13 also shows that lower stabilizing arm 140, with telescopically sliding distal end, can be used in combination with level 182 built into ladder 110. In this embodiment, a 12° divergence from plumb from the top of ladder 110 to its bottom end has been found desirable. Level 182 could be built along the ladder rail 112 in a position that would visually indicate a center position of the bubble in the bubble level when the ladder is at that 12° offset from plumb. This common combination with level 180, would allow the installer to place the ladder in the approximate preferred position based on those two levels, adjust the lower legs, and extend and strap arm stabilizer 140 and cinch it by strap 18 around tree 8. The user could climb up and also extend upper stabilizing arm 140. The user could then climb further and cinch the top of ladder 110 with an upper strap 134 (FIG. 12).

Figure 14:
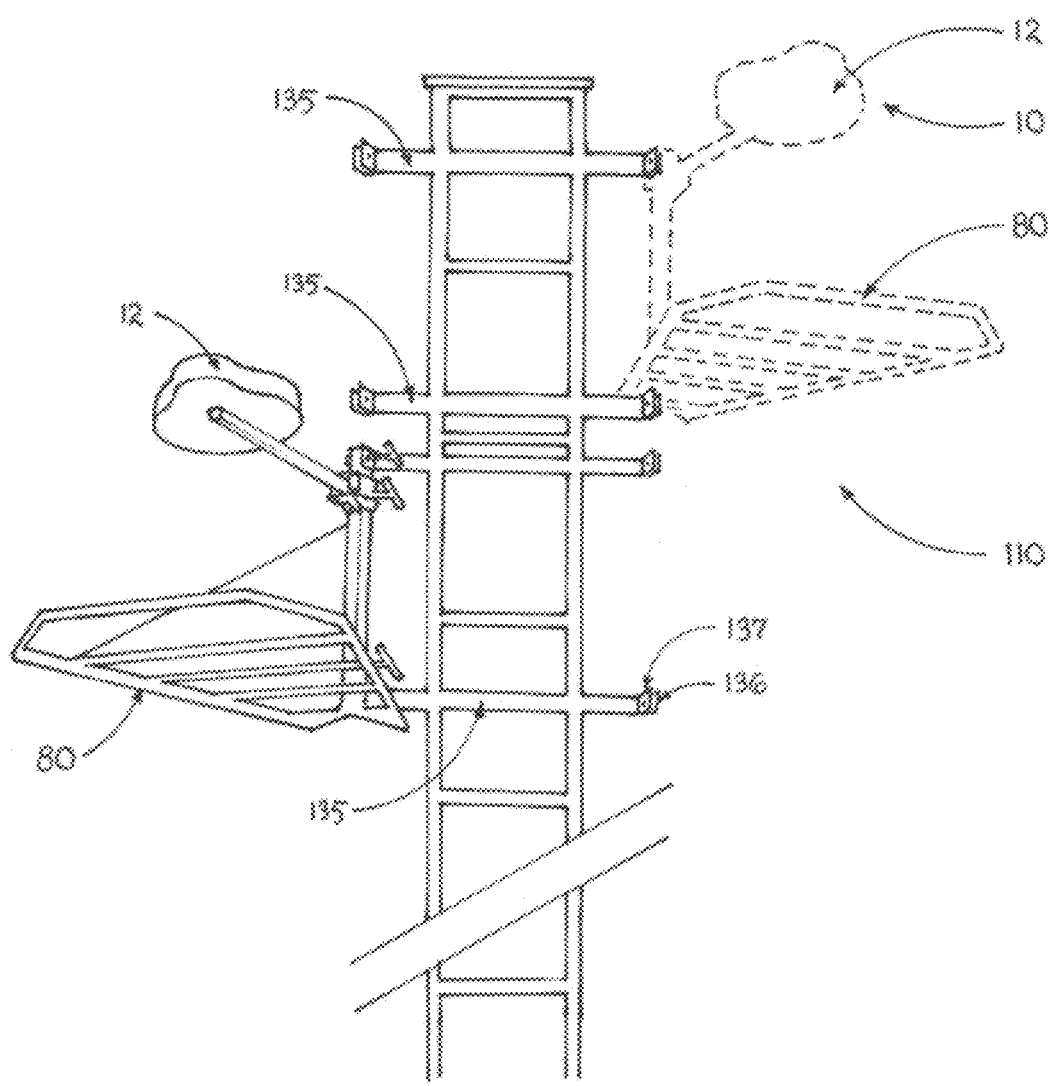
FIG. 14 is an enlarged partial front perspective of the top of the assembled ladder of FIG. 13.

FIG. 13 then shows, in combination with FIG. 14, that one or more seats (herewith foot support 80), can be hauled up the install ladder 110 and easily and quickly mounted. In this example, a backbone 14 would have upper and lower sets of openings that would match the distance between the pairs of openings in ear sets 136 and 137 at the ends of each cross bars 135 fixed along top of ladder 110. T-bolts like T-bolt 146 could be extended through to lock upper and lower ends of tube 50 to the position shown in FIG. 14. Bracket 40 with cantilever arm 20 and eccentric seat 12 can then be mounted along that backbone, as can foot rest 80. This would be the same as described earlier.

As further shown in FIGS. 13 and 14, by having three sets of spaced apart cross bars 135 at the top of ladder 110, one seat assembly 10 could be attached between two such cross bars 135. As shown in base lines, another seat assembly 10' could be attached between a set of cross bars 135 on the other side and a different set of cross bars 135. This offsetting allows for balancing of two seat assemblies 10 on opposite sides of the ladder but also gives clearer directional line of sight for each user. It is to be appreciated, however, that the seat assemblies could be at the same level (e.g. attached to the same two cross bars 135 but on opposite sides). It is further to be appreciated there could be four cross bars 135 for additional mounting variations for the seat assemblies 10. It can have stabilizer bars 140 along its length. It furthermore can have a cinching strap 135 at or near its top to hold it into position and optimally other straps in other positions. It is to be understood that the 12° angle that is preferred for the intent of ladder 110 relative to the vertical could vary according to need or desire. The number of sections, the length of ladder 110, and other features could vary according to need or desire.

Another feature of ladder assembly 110 is that it can have a set of three spaced apart cross bars 135, each having a set of ears 136, 137 or other mounting receivers at opposite ends. This would allow multiple seat assemblies 10 to be concurrently mounted and used on the same ladder. For example, in FIG. 8, each cross bar 135 has a set of ears 136, 137 at opposite ends. Those ears can be basically spaced apart vertically aligned ears having a set of apertures that correspond to apertures 45 in ears 43 and 44 of bracket 40 (see FIG. 2). Then, with a bolt 139 (could be like T-bolt 146 of FIG. 2), each seat assembly 10 can simply be brought to an end of a ladder cross bar 135, the apertures between bracket 40 and ears 136, 137 align, a bolt inserted and secured, and then a whole seat assembly 10 is mounted along ladder 110. As can be appreciated from FIGS. 13 and 14, one or more seat assemblies 10 can be placed on ladder 110, each on a set of cross bars 135. One seat could be mounted higher, and another lower bar. They can be on opposite sides to help balance. More than two could be added. As can be appreciated, ladder 110 for any of its features, could be utilized with other tree stands or portable seats than those of the exemplary embodiments. For example, variable tree stands or seats could be mounted along ladder 110 and take advantage of its self-leveling bubble levels which are built in, its bottom adjusting legs, its stabilizing arms 140, or any combination of the above.

FIG. 12 also shows that top of ladder 110 could have a V-shaped serrated jaw 132 to help center the top of a ladder on a tree. Strap 134 would work similarly to cinching strap 16 and cinch 18 of FIG. 1.

The support arms 140 could simply be hinged U-shaped rigid arms that could extend from rails 112 at one or more locations, have a V-shaped cross member 144 at the ends of legs 142, and cinch at that location around a tree with cinching strap 134.

Ladder 110 can have multiple spaced apart rungs 116. It can be disassembled into three sections but assembled into a unitary ladder at joints 146 by T-bolts 148. This would allow it to be carried in three sections and then assembled and hinged up into an elongated position on site.

The adjustable feet 127 allow ladder to be supported as plumb as possible on uneven ground by sliding and locking legs 126 in place. Levels 180 and 182 can assist in finding as close to plumb and angled positions as possible. Level 182 can also be used to achieve the right angle of the extended ladder relative to a vertical support such as a tree. As can be appreciated just one level or both levels, could be utilized.

Spacer or stabilizer 140 could have arms 142 made of two telescoping sections that can be adjusted longitudinally (see stabilizing section 140 in the middle of FIG. 8). This would allow some adjustability relative a tree or other vertical support.

It can be appreciated that variations obvious to those skilled in the art will be included within the invention. The invention can take many forms and embodiments. The materials, the exact dimensions and configurations can vary according to desire or need.

What is claimed is:

1. A portable seat, comprising:
   a. a single elongated arm having a length between a proximal end and a distal end, the proximal end pivotally attachable to a base around a first pivot axis allowing the single elongated arm to freely swing over a range of movement in a first plane; and
   b. a seat having a top, a bottom, a center and a periphery, a mounting bracket extending substantially across and non-pivotally fixed at least at two spaced apart locations on the bottom of the seat, the mounting bracket freely pivotally eccentrically mounted at a pivot point at or near the distal end of the single arm along a second pivot axis at the periphery of the seat, the second pivot axis being generally parallel to the first pivot axis allowing the seat to freely eccentrically rotate around the second pivot axis at the distal end of the single arm;
   c. the base comprising an elongated member generally parallel with the first and second pivot axes; and
   d. the seat having a distance between the pivot point at the second pivot axis and an opposite peripheral side which is less than the length of the single arm, allowing the periphery of the seat at the pivot point to eccentrically rotate at the distal end of the single arm and the remainder of the seat to rotate over and across all of the single arm without interference by the base and away from over or across the single arm;
   e. an adjustment mechanism to adjust the angle between the arm and the base;
   so that a person can sit on the seat when installed, with a front side facing of the seat, the eccentric pivot point of the seat and a rear side facing the opposite peripheral side of the seat, and control both pivoting of the single arm at the base and eccentric rotation of the seat around the distal end of the single arm.

2. The seat of claim 1 further comprising a second single arm pivotally attached to the base and a second seat eccentrically pivotally attached at or near a distal end of the second single arm, allowing two arms with eccentric seats on the same base.

3. The seat of claim 1 further comprising a shooting stick receiver extending from the seat mount.

4. The seat of claim 1 further comprising a level on the arm to assist leveling of the seat.

5. The seat of claim 1 further comprising a strap and cinch connected to the base.

6. The seat of claim 1 wherein the base is attached to a tree stand.

7. The seat of claim 1 wherein the base is attached to a double ladder hunting stand.

8. The seat of claim 1 attached to a ground mounted chair or tripod.

9. The seat of claim 1 further comprising mounting ears to mount the seat to a supporting structure.

10. The seat of claim 1 wherein the seat is held above the arm to allow 360° eccentric rotation of the seat over the arm.

11. The seat of claim 1 wherein the base comprises connectable to the second end of the arm, the backbone being elongated generally parallel to the first and second pivot axes.

12. The seat of claim 11 further comprising an adjustable bracket relative to the backbone.

13. The seat of claim 1 further comprising a foot rest.

14. The seat of claim 1 in combination with a ladder comprising one or more extensions and including telescoping legs oblique to the longitudinal axis of the ladder at or near the bottom of the ladder, one or more built in levels for positioning of the ladder relative to reference planes; and one or more cross bars along the ladder having mountable locations for a seat or tree stand.

* * * * *

UNITED STATES PATENT AND TRADEMARK OFFICE
CERTIFICATE OF CORRECTION

PATENT NO. : 9,743,774 B1
APPLICATION NO. : 14/020055
DATED : August 29, 2017
INVENTOR(S) : Aaron L. Hauser Page 1 of 1

It is certified that error appears in the above-identified patent and that said Letters Patent is hereby corrected as shown below:

<u>In Column 14, Claim 11, Lines 32 and 33:</u>
INSERT --a backbone-- after comprises Signed and Sealed this
Nineteenth Day of December, 2017

Joseph Matal
*Performing the Functions and Duties of the
Under Secretary of Commerce for Intellectual Property and
Director of the United States Patent and Trademark Office*